(12) United States Patent
Balsells Mercade

(10) Patent No.: US 10,661,996 B2
(45) Date of Patent: May 26, 2020

(54) FLEXIBLE RETICULAR STRUCTURE

(71) Applicant: Manufacturas y Transformados AB, S.L.U., Igualada (ES)

(72) Inventor: Antoni Balsells Mercade, Igualada (ES)

(73) Assignee: Manufacturas Y Transformados AB, S.L.U., Igualada, Barcelona (ES)

(*) Notice: Subject to any disclaimer, the term of this patent is extended or adjusted under 35 U.S.C. 154(b) by 0 days.

(21) Appl. No.: 16/282,672

(22) Filed: Feb. 22, 2019

(65) Prior Publication Data

US 2019/0263594 A1    Aug. 29, 2019

(30) Foreign Application Priority Data

Feb. 23, 2018 (ES) .................................. 201830162

(51) Int. Cl.
| | | |
|---|---|---|
| *B65G 17/00* | (2006.01) | |
| *B65G 17/08* | (2006.01) | |
| *B65G 17/40* | (2006.01) | |
| *B65G 17/34* | (2006.01) | |
| *B65G 17/24* | (2006.01) | |
| *B26D 7/20* | (2006.01) | |

(52) U.S. Cl.
CPC .............. *B65G 17/24* (2013.01); *B26D 7/20* (2013.01); *B65G 17/08* (2013.01); *B65G 17/34* (2013.01); *B65G 17/40* (2013.01)

(58) Field of Classification Search
None
See application file for complete search history.

(56) References Cited

U.S. PATENT DOCUMENTS

| | | | | |
|---|---|---|---|---|
| 4,512,460 | A | 4/1985 | McMaster | |
| 5,558,204 | A * | 9/1996 | Daringer | B65G 15/54 198/778 |
| 6,935,489 | B2 * | 8/2005 | Kawasaki | B65G 17/22 198/580 |
| 7,097,030 | B2 * | 8/2006 | Gundlach | B65G 17/08 198/834 |
| 7,850,001 | B2 * | 12/2010 | Krisl | B65G 17/08 198/845 |
| 7,971,708 | B2 * | 7/2011 | Menke | B65G 17/40 198/779 |
| 9,731,902 | B2 | 8/2017 | Mercade | |
| 2009/0260957 | A1 | 10/2009 | Krisl | |

FOREIGN PATENT DOCUMENTS

| | | |
|---|---|---|
| EP | 0507327 A1 | 10/1992 |
| WO | 2005014443 A1 | 2/2005 |

* cited by examiner

*Primary Examiner* — Kavel Singh
(74) *Attorney, Agent, or Firm* — Edwin S. Flores; Chalker Flores, LLP

(57) ABSTRACT

The flexible reticular structure comprises a movable surface (1) the movement of which is operated by operating means (2), said surface (1) being formed by a plurality of modules (3) linked to one another by means of attachment rods (5), each of said rods (5) being housed in holes (6) provided in at least two of said modules (3) wherein each module (3) comprises at least one wheel (4) assembled in at least one of said rods (5).
It enables the flexible reticular structure to be able to be moved easily.

11 Claims, 3 Drawing Sheets

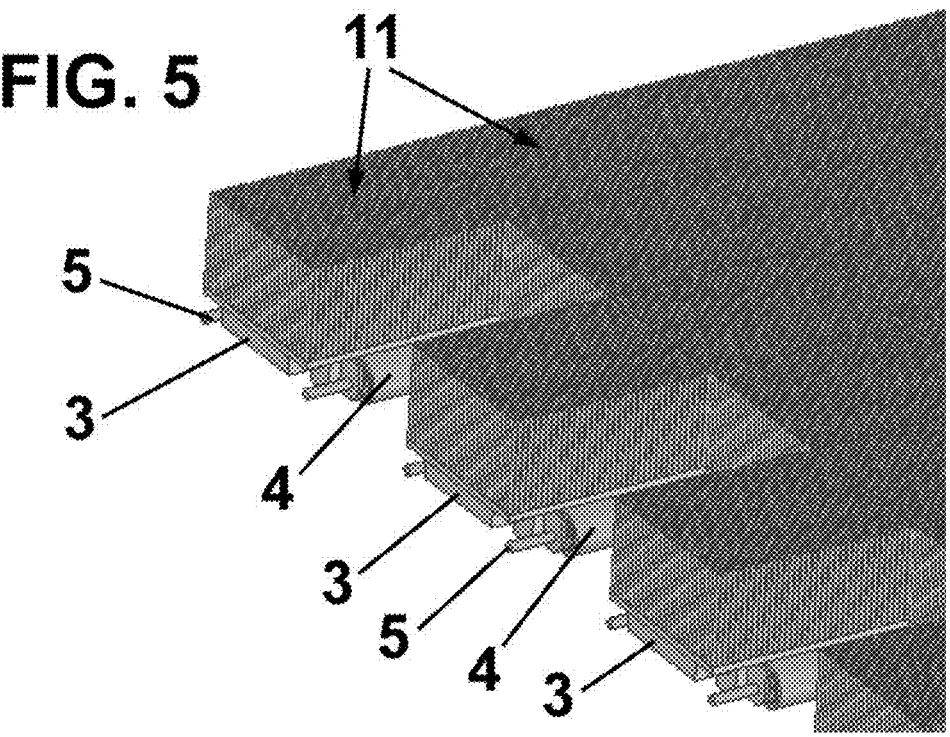
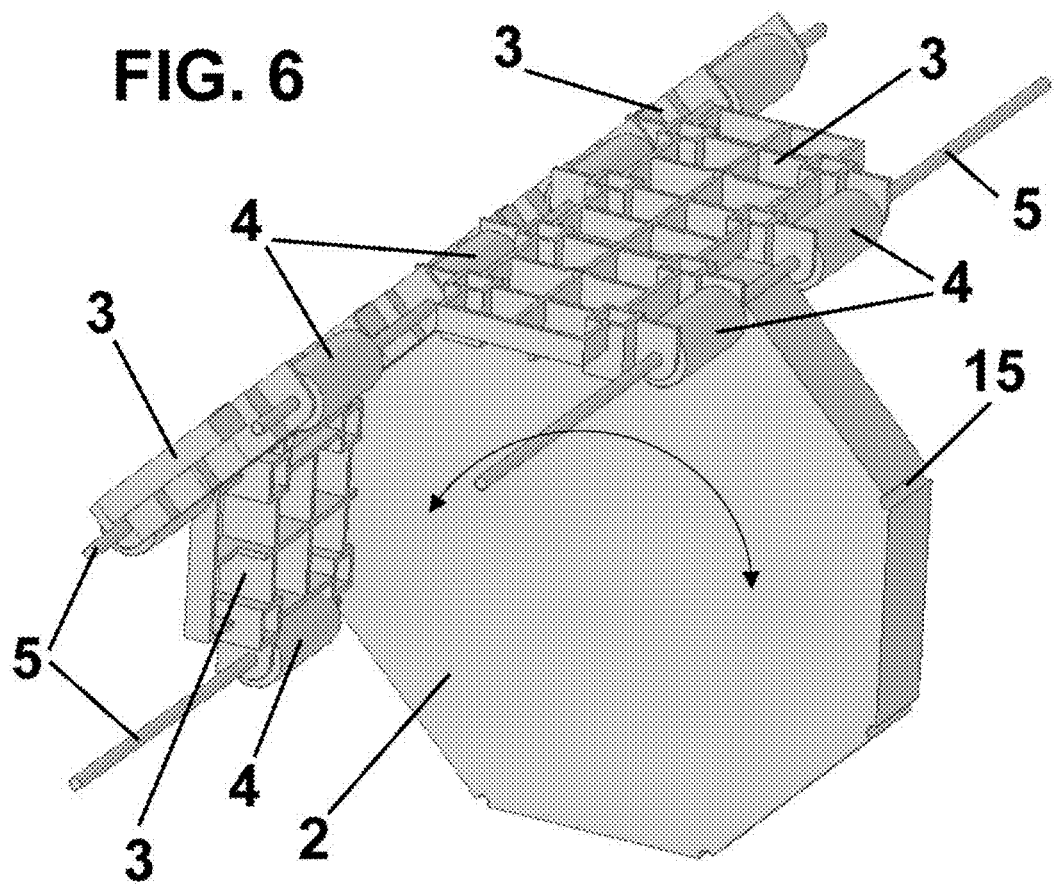

FLEXIBLE RETICULAR STRUCTURE

CROSS-REFERENCE TO RELATED APPLICATIONS

This application claims priority to Spanish Patent Application No. P201830162 filed on Feb. 23, 2018, the contents of which is incorporated by reference herein.

The present invention relates to a flexible reticular structure, in particular to a modular flexible reticular structure whereon additional elements can be assembled, and which has incorporated rolling elements to facilitate the movement thereof.

BACKGROUND OF THE INVENTION

Flexible reticular structures are used in different applications, and comprise a movable surface for conveying goods.

For example, one type of flexible reticular structure is used to move laminar material for the cutting thereof by means of a head, said laminar material being able to be paper or fabric. In this case, a base element is placed on the movable surface in order to enable the cutting of said laminar material.

A problem associated with conventional conveyance systems is that in the case of repair or maintenance it is necessary to remove or substitute all or a large part of the movable surface, with the subsequent economic cost associated.

Furthermore, in conventional conveyance systems the movement of said movable surface is operated by at least one motor, or a pair of motors, if the movable surface advances in two directions.

Another problem associated with conventional conveyance systems is that the movable surface tends to slide on support surfaces, meaning that the operating motor has to overcome the friction due to the weight of the conveyed elements, for which reason it must be oversized, with the subsequent associated economic cost.

Document EP 3 106 411 A1, of the same holder as the present application, describes a flexible reticular structure comprising a movable surface the movement of which is operated by means of operating means, said surface being formed by a plurality of modules linked to one another by means of attachment rods, each of said rods being housed in holes provided in at least two of said modules.

In this flexible reticular structure, the repair and maintenance operations can be performed more comfortably and quickly, and therefore more economically.

However, said flexible reticular structure is not optimised to be operated when it has to convey high loads.

Therefore, there is clearly a need for a flexible reticular structure wherein the repair and maintenance operations can be performed in a more comfortable and quick manner, and which in turn enables large loads to be moved without needing to oversize the operating elements.

DESCRIPTION OF THE INVENTION

The flexible reticular structure of the invention resolves the drawbacks mentioned and has other advantages which are described below.

The flexible reticular structure according to the present invention comprises a movable surface the movement of which is operated by operating means, said surface being formed by a plurality of modules linked to one another by means of attachment rods, each of said rods being housed in holes provided in at least two of said modules, and is characterised in that each module comprises at least one wheel assembled in at least one of said rods.

Due to the presence of one or more wheels, the flexible reticular structure according to the present invention can be moved easily.

Advantageously, each module comprises tabs wherein the holes are located, two adjacent tabs defining a housing for placing a wheel. Thus, the wheels are housed in spaces which would otherwise be wasted. Advantageously, said tabs prevent the lateral movement of said wheels, thereby keeping them from moving from the established position thereof and leaving them conveniently distributed throughout the entire structure.

Preferably, said tabs define first housings and second housings, the length of the first housings being greater than the length of the second housings. Thanks to this characteristic, the tabs of the second housings can be placed between the tabs of the first housings of an adjacent module, thereby enabling the attachment rod of said modules to remain right at the intersection of said modules.

Preferably, inside the same module, said first housings with a greater length, if there is more than one, would be located facing each other; and in the same manner said second housings with a smaller length would also be located facing each other, next to the first housings. Said distribution enables the assembly of the different modules to be carried out in a linear manner and in an alternating manner. Advantageously, the alternating assembly of the different modules gives overall greater stiffness to the flexible reticular structure.

According to a preferred embodiment, the wheel is a roller which substantially encompasses the entire length of the housing, and said roller can include a bearing therein to reduce the friction between the roller and the rod.

Advantageously, each module is made up of a plurality of transverse and longitudinal dividers which define rectangular and/or quadrangular cells. Thus, a module is achieved with reduced weight, which also facilitates the movement of the flexible reticular structure.

Advantageously, said rectangular and/or quadrangular cells enable a greater passage of fluids through said module, for example, air, being very useful in applications which, for example, have to work with a vacuum on the upper surface of the flexible reticular structure, and likewise creating a self-cleaning effect.

Furthermore, each module preferably comprises a recessed portion in the middle part and/or on the ends thereof for placing the operating means.

Said modules also advantageously comprise holes for fastening corresponding additional elements on the upper part of the flexible reticular structure, for example, brushes provided with bristles. Said additional elements enable the surface to be adapted according to different applications. Said fastening holes of corresponding additional elements can be distributed regularly or irregularly. It is obvious for a person skilled in the art that said additional elements can be any element, in addition to bristle brushes, which can facilitate conveyance of the material to be handled according to the application.

Said additional elements can be fastened by any other fastening means, in addition to the fastening holes, which can be screws, adhesive, etc.

Said operating means comprise an operating element for moving said movable surface in both directions. Advantageously, said operating means (motors or equivalents) can operate along the width of the entire structure using several drive means (pinions, gears or equivalents), better distributing forces on the flexible reticular structure and not only on the sides.

BRIEF DESCRIPTION OF THE DRAWINGS

To better understand what has been set forth above, several drawings schematically depicting only by way of non-limiting example a practical embodiment are attached.

FIG. 5 is a perspective view of the upper part of a portion of a flexible reticular structure according to the present invention, with a plurality of brushes assembled on the movable surface; and FIG. 6 is a perspective view of a plurality of modules of the flexible reticular structure according to the present invention assembled on an operating element.

DESCRIPTION OF A PREFERRED EMBODIMENT

Figure 1:
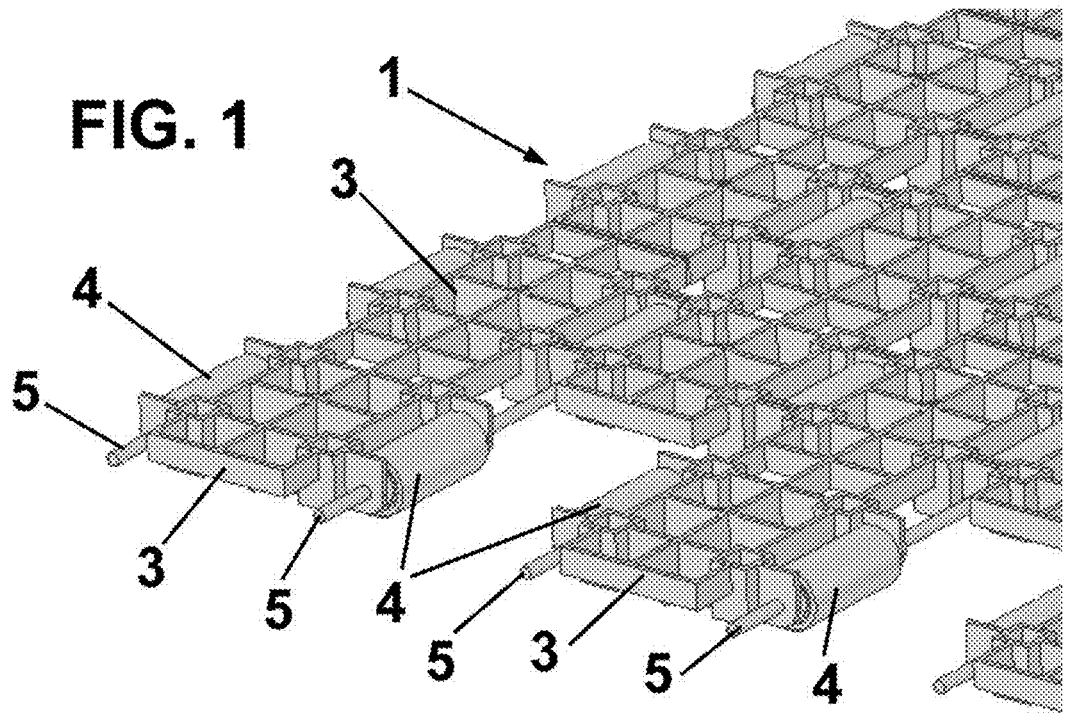
FIG. 1 is a perspective view of the upper part of a portion of a flexible reticular structure according to the present invention.

FIG. 1 shows the perspective view of a movable surface, generally indicated by the numerical reference 1, of a flexible reticular structure according to the present invention.

Said movable surface 1 is preferably operated by means of an operating element 2, which can be seen in FIG. 6, in the two directions thereof.

Furthermore, said surface 1 is modular, meaning, it is made up of a plurality of modules 3 linked to one another. The linking or coupling of said modules is carried out by means of longitudinal rods 5, which are introduced into holes 6 of said modules 3.

Figure 2:
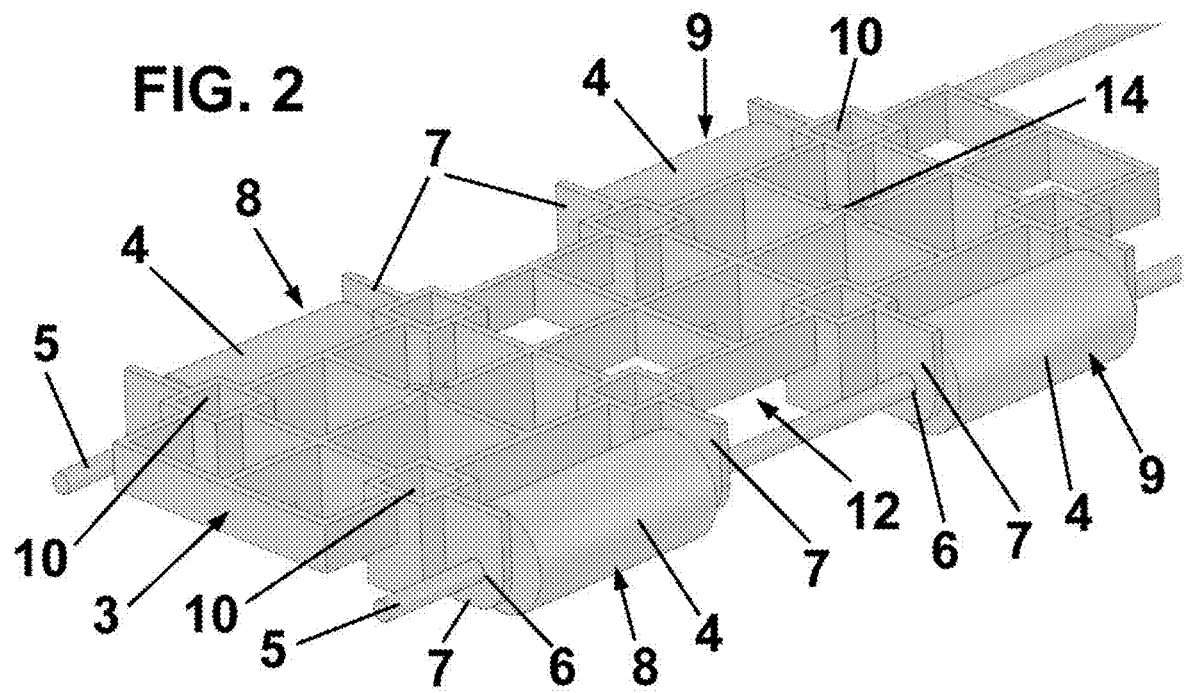
FIG. 2 is a perspective view of the upper part of a module of a flexible reticular structure according to the present invention, with the attachment rods and wheels thereof.
Figure 3:
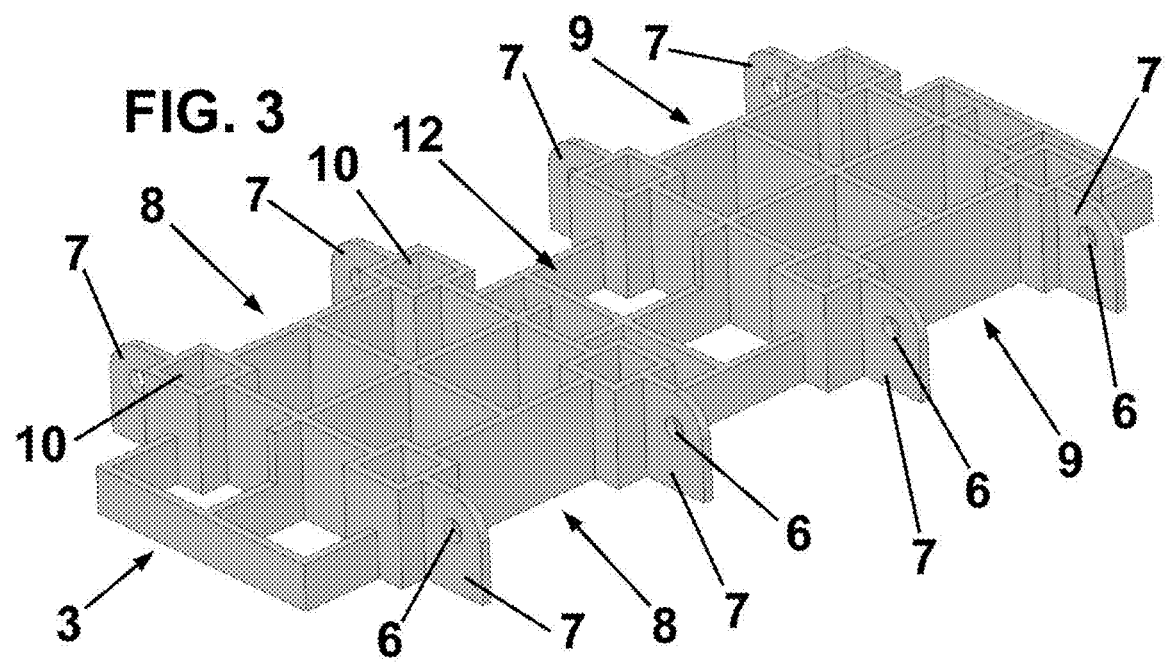
FIG. 3 is a perspective view of the lower part of a module of a flexible reticular structure according to the present invention, without attachment rods or wheels.

As can be better observed in FIGS. 2 and 3, said holes 6 are arranged in tabs 7 of the modules 3, which project laterally from said modules 3.

According to the present invention, each module 3 comprises at least one wheel 4, which is assembled in at least one of said longitudinal rods 5. According to the embodiment shown in FIG. 2, each module 3 comprises four wheels 4, two on each side of the module 3.

In particular, each wheel 4 is placed in a first housing 8 or a second housing 9 defined between two adjacent tabs 7, as seen in FIG. 2.

In order for two adjacent modules 3 to be able to be placed next to each other with the minimum separation between them, the length of the first housings 8 is greater than the length of the second housings 9. Furthermore, each wheel 4 substantially occupies the entire length of the respective housing 8, 9.

In FIG. 2, it can be seen how said first housings 8 with a greater length are located facing each other, as well as said second housings 9 with a smaller length also being located facing each other, next to the first housings 8.

According to the embodiment shown in FIG. 2, each wheel 4 is a roller, which can include at least one bearing therein to decrease the friction between the wheel 4 and the rod 5.

Advantageously, each module 3 is made up of a plurality of longitudinal and transverse dividers which define rectangular, quadrangular and/or polygonal cells, maximising the structural resistance thereof and reducing the weight of each module 3 as much as possible. Furthermore, this characteristic enables the circulation of fluid through said module.

Additional elements can be placed on said movable surface 1. To do so, said modules 3 comprise fastening holes 10, although they could comprise any suitable fastening or coupling means (shown as square holes, these can be any anchoring method: round holes, square holes, clips, guides, screws, glue, etc.).

Figure 4:
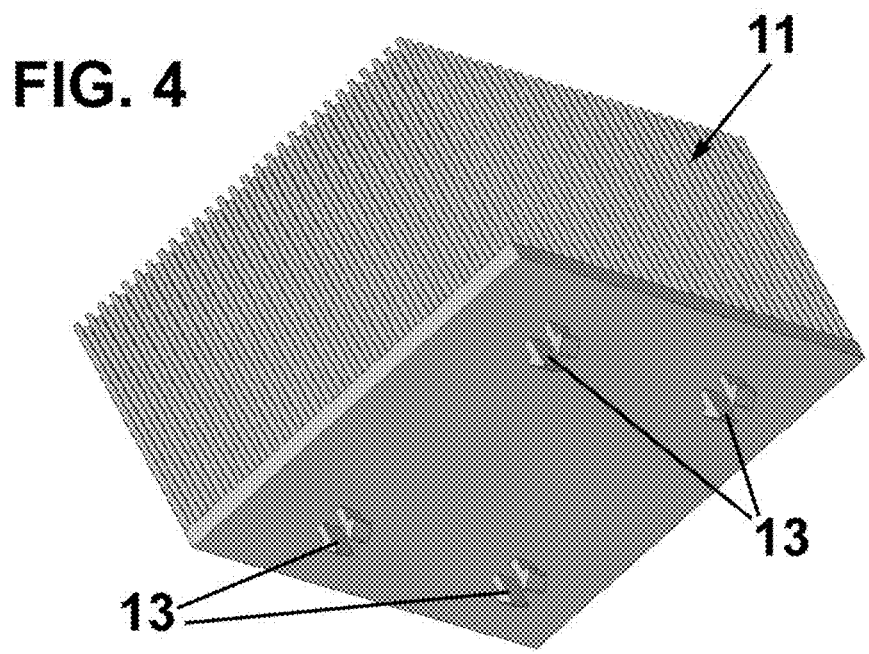
FIG. 4 is a perspective view of the lower part of an additional element which is fastened on a module, in this case, a brush.

In this representation, the brushes include clips 13 in the lower surface which fit into the fastening holes 10, as seen in FIG. 4.

According to the embodiment shown in FIG. 5, said additional elements are brushes 11 provided with bristles which couple onto said modules 3. In this case, to enable the bristles of the brushes 11 to open when the lower surface thereof is pressed, each module 3 comprises protuberances 14, which in the assembly position will press on the lower surface of said brushes 11 so that the bristles open (desired effect in the applications for cutting laminar material).

These brushes 11 are preferably used to act as a base for a laminar material, such as paper or fabric, which will be cut by means of a suitable cutting device. The bristles of said brushes 11 will act as a support for the laminar material, but the blade of the cutting device will be able to pass between them.

FIG. 6 shows a plurality of modules 3 assembled on an operating element, which makes up part of the operating means 2, for operating the movement of the movable surface 1.

For the assembly thereof, each module 3 comprises at least one recessed portion 12 in the middle part thereof and/or on the ends thereof to house the operating element. Said operating element has a polygonal shape, seen in a plan view, and comprises grooves 15 in the vertices thereof to house the rods 5. To do so, the wheels 4 of the modules 3 do not occupy the entire length thereof, rather they define a free separation between the housings 8, 9.

Despite the fact that reference has been made to a specific embodiment of the invention, it is evident for the person skilled in the art that numerous variations and changes may be made to the flexible reticular structure described, and that all the aforementioned details may be substituted by other technically equivalent ones, without detracting from the scope of protection defined by the attached claims.

The invention claimed is:

1. A flexible reticular structure, comprising a movable surface (1) the movement of which is operated by operating means (2), said surface (1) being formed by a plurality of modules (3) linked to one another by means of attachment rods (5), wherein each module (3) comprises tabs (7) wherein the holes (6) are placed, two adjacent tabs (7) defining a housing (8, 9) for placing a wheel (4), and each of said rods (5) being housed in holes (6) provided in at least two of said modules (3), and is characterised in that each module (3) comprises at least one wheel (4) assembled in at least one of said rods (5), and wherein said tabs (7) define first housings (8) and second housings (9), the length of the first housings (8) being greater than the length of the second housings (9).

2. The flexible reticular structure according to claim 1, wherein said first housings (8) are located facing each other, and said second housings (9) are located facing each other.

3. The flexible reticular structure according to claim 1, wherein said first housings (8) are located laterally to each other, and said second housings (9) are located laterally to each other.

4. The flexible reticular structure according to claim 1, wherein the wheel (4) is a roller which substantially encompasses the entire length of the housing (8, 9).

5. The flexible reticular structure according to claim 1, wherein the wheel (4) comprises a bearing therein.

6. The flexible reticular structure according to claim 1, wherein each module (3) is made up of a plurality of transverse and longitudinal dividers which define rectangular, quadrangular and/or polygonal cells.

7. The flexible reticular structure according to claim 1, wherein each module (3) comprises a recessed portion (12) in the middle part thereof and/or on the ends thereof for placing the operating means (2).

8. The flexible reticular structure according to claim 1, wherein said modules (3) comprise holes (10) for the fastening of corresponding additional elements.

9. The flexible reticular structure according to claim 8, wherein said additional elements are brushes (11) provided with bristles.

10. The flexible reticular structure according to claim 1, wherein said operating means comprise at least one operating element (2) for moving said movable surface (1) in both directions.

11. The flexible reticular structure according to claim 2 wherein the wheel (4) comprises a bearing therein.

* * * * *